Dec. 28, 1948.  H. B. WHEELER  2,457,512
HIGHWAY WARNING SIGNAL
Filed Oct. 27, 1944  3 Sheets-Sheet 1
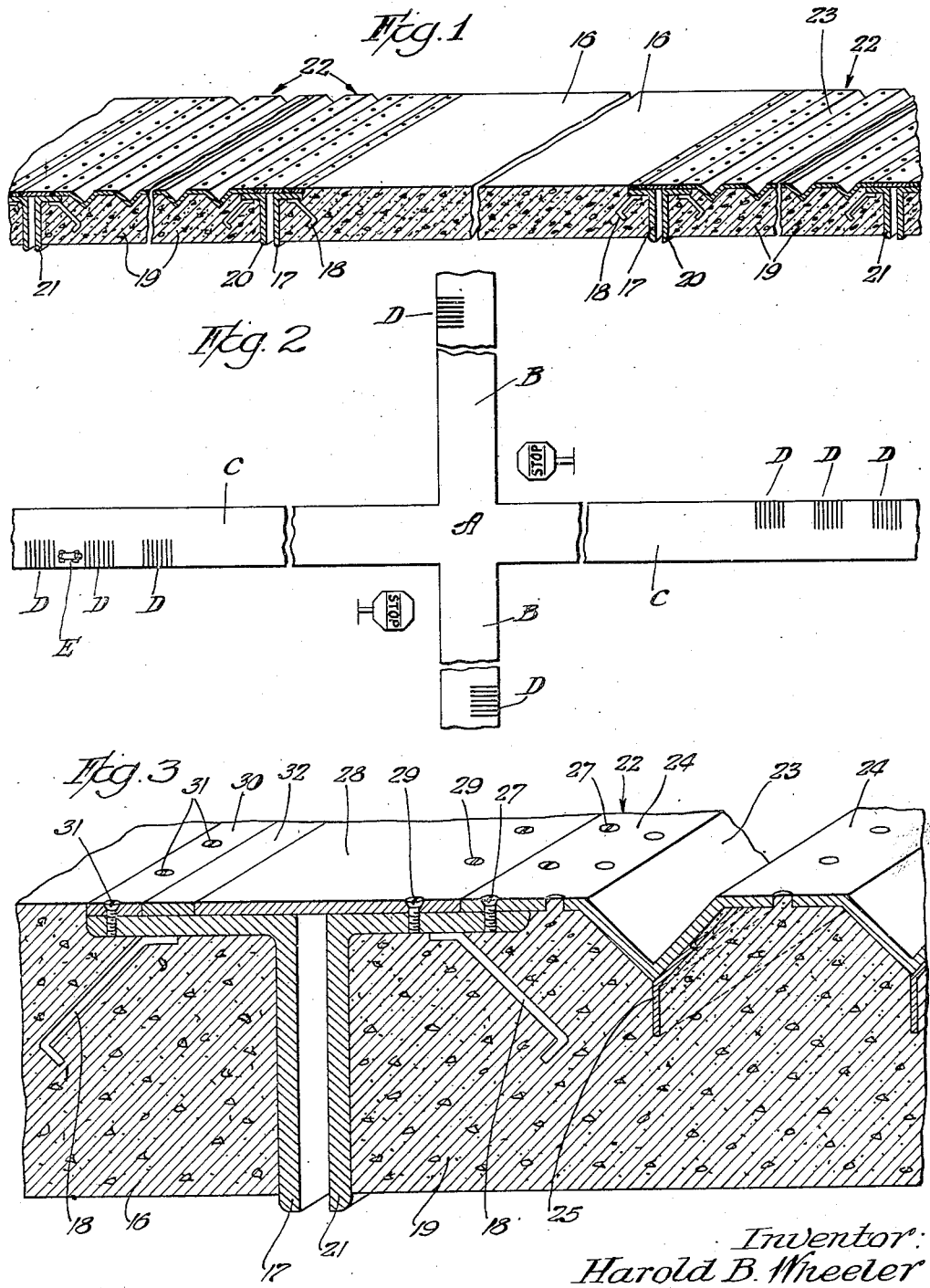
Inventor:
Harold B. Wheeler Dec. 28, 1948.   H. B. WHEELER   2,457,512
HIGHWAY WARNING SIGNAL
Filed Oct. 27, 1944   3 Sheets-Sheet 2
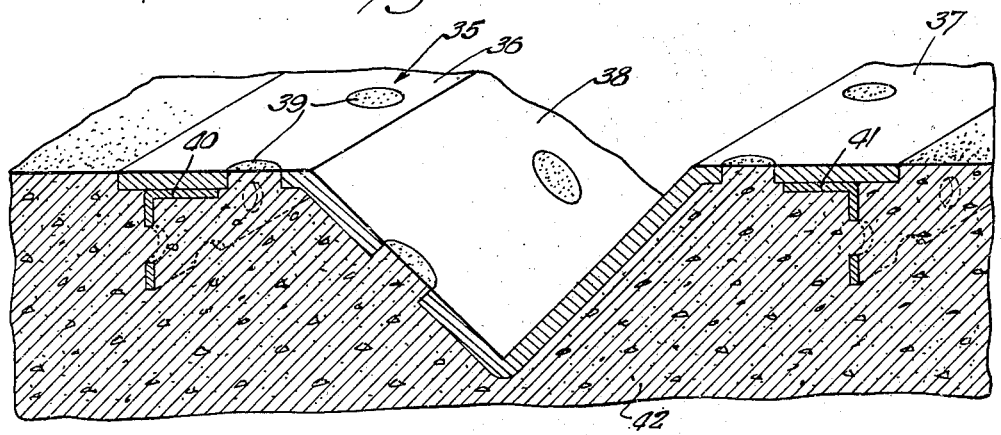
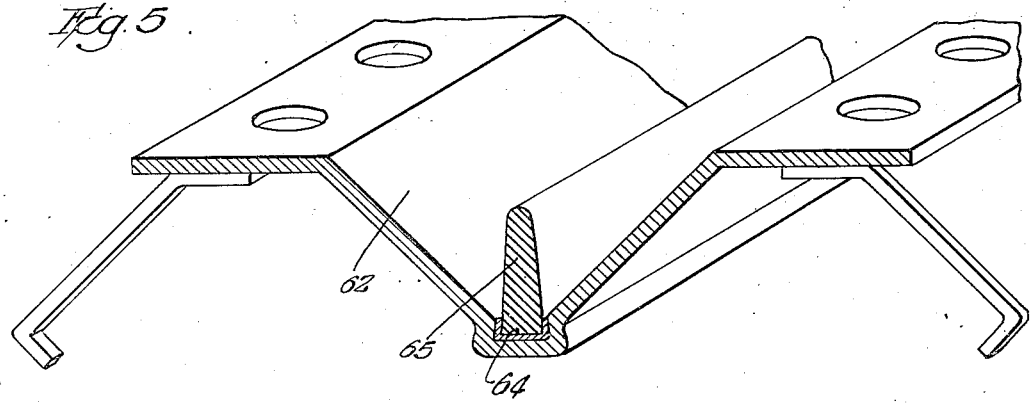
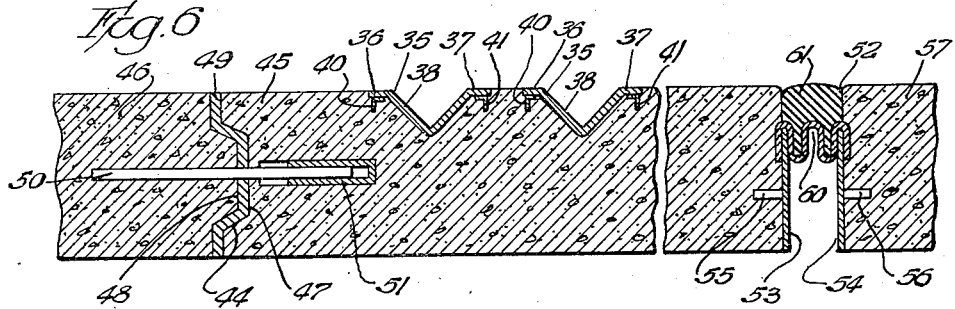
Inventor:
Harold B. Wheeler
By McCabb Wendt & Dickinson
Attys Dec. 28, 1948.   H. B. WHEELER   2,457,512
HIGHWAY WARNING SIGNAL
Filed Oct. 27, 1944   3 Sheets-Sheet 3

Inventor:
Harold B. Wheeler
By: McCabe Wendt + Dickinson
Attys.

Patented Dec. 28, 1948

2,457,512

UNITED STATES PATENT OFFICE 2,457,512

HIGHWAY WARNING SIGNAL

Harold B. Wheeler, Berwyn, Ill., assignor of one-half to Albert G. McCaleb, Evanston, Ill.

Application October 27, 1944, Serial No. 560,564

5 Claims. (Cl. 94—1)

This invention relates to highway warning signals.

More specifically, the invention contemplates a highway pavement having signal generating areas which cooperate with the "rolling flats" of the tires of rapidly traveling automotive vehicles to produce extremely effective danger or caution signals which are both audible and physically sensible to the drivers of the vehicles, the generation of such signals being accomplished without increase of driving hazard and without discomfort to the drivers or the passengers.

Each of the signal generating areas, being located in advance of an intersection or comparable region of danger, consists of a multiplicity of parallel channels extending at right angles to and entirely across the highway lane in which they are formed. The several channels of each signal generating area are separated by ridges having upwardly presented relatively wide faces which are co-planar with the upper surfaces of those portions of the highway lane lying adjacent to and fore and aft of the signal generating area.

The relationship between (a) the width of the channel tops and (b) the width of the flat faces lying between the channels, and the relationship between (c) the distance between the center of each channel and the center of each proximate channel and (d) the lengths of the "rolling flats" of the tires passing over the signal generating areas, are important to the end that the audible and physically sensible signals characteristic of my invention may be generated without causing any perceivable vertical movements of the axes of the wheels comprising such tires, or otherwise throwing any strain upon the vehicle tending to increase driving hazard or diminish passenger comfort. By "rolling flat" I mean that portion of the tread of each tire which at all times is presented flatwise to the pavement over which the tire is rolling. As hereinafter more fully explained, the center-to-center distance between proximate channels should be greater than the length of the shortest rolling flats, and smaller than the length of the longest of the rolling flats, passing over the signal generating areas; and the widths of the channel tops and the widths of the flat faces intervening between the channels should be substantially equal.

The invention also contemplates novel metal structures wherewith to form the requisite signal generating areas in the traffic lanes of concrete highways. An incidental but meritorious feature of the invention resides in novel means for causing the rupture of ice forming in the channels of the signal generating areas.

The foregoing and other features, objects and advantages of the invention will appear from the detailed description to follow wherein reference is made to the accompanying three sheets of drawings.

The present application is a continuation-in-part of my copending application Serial No. 381,984, filed March 6, 1941 (wherein claims 3 to 7 of the present application originated and were allowed). Said application No. 381,984 has since been abandoned.

In the drawings:

Figure 1 is a view in section and in perspective, showing a fragment of a slab pavement embodying the present invention;

Fig. 2 is a plan view, greatly reduced in scale, of a highway intersection provided with signal generating areas of the present invention;

Fig. 3 is an enlarged view in section and in perspective of a fragment of pavement, showing a joint between a normal flat surface pavement slab and a channeled slab having the present invention embodied therein, it being the upper surface of the structure that is exhibited in perspective;

Fig. 4 is a further enlarged fragmentary, sectional and perspective view depicting a modified form of channel reenforcing member set into a paving slab;

Fig. 5 is a fragmentary view in section and in perspective, depicting a further modified form of channel reenforcing member;

Figure 7:
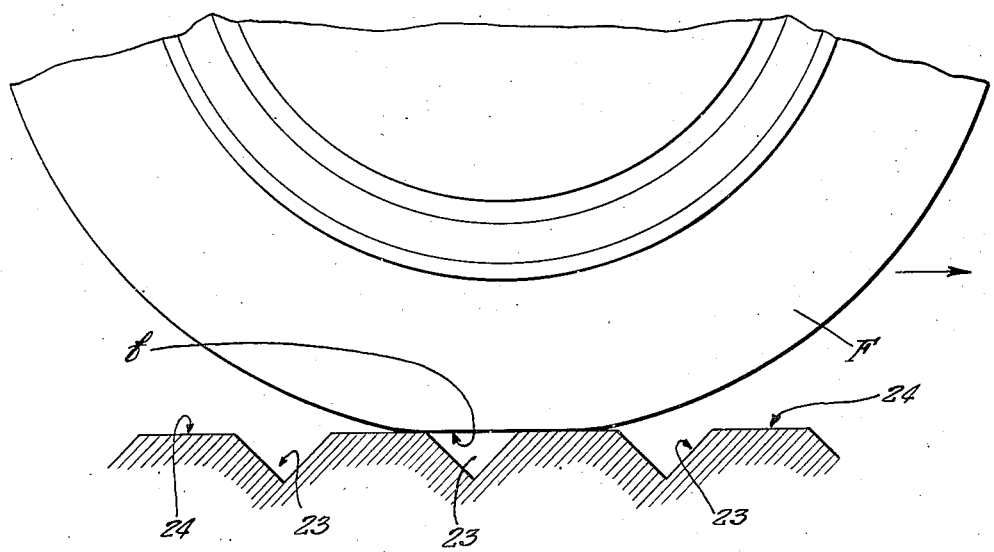
Figure 8:
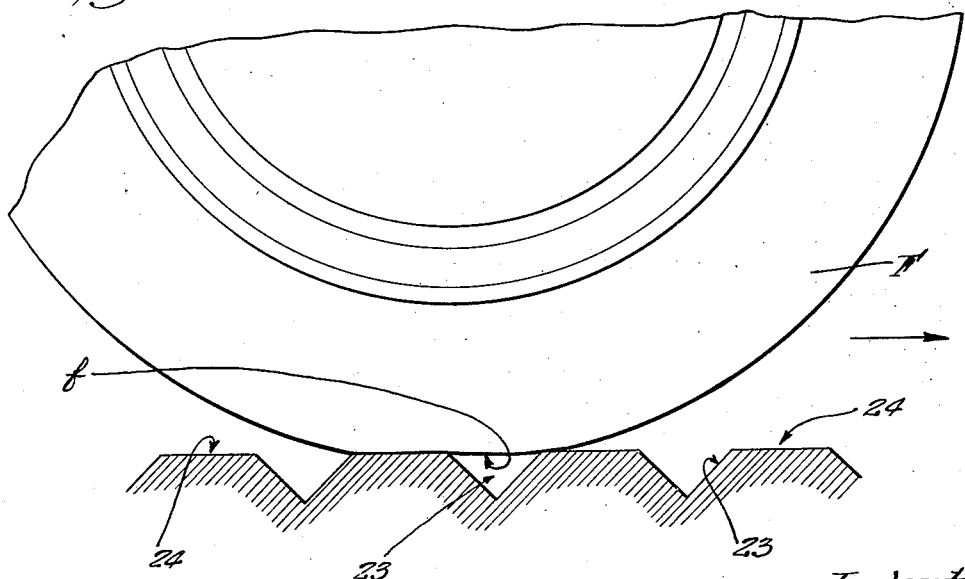

Fig. 6 is a vertical longitudinal section through a portion of pavement, this view depicting expansion joint arrangements in connection with a pavement slab embodying the present invention, an intermediate slab portion being broken away; and Figs. 7 and 8 are digarammatic views illustrating how the channels and intervening flat surfaces of a signal generating area cooperate with the rolling flat of a passing tire to generate the audible and physically sensible gentle signals of the present invention.

In the drawings A indicates the intersection of a main highway B and a secondary highway C. It may be assumed that all traffic on secondary highway C is required to come to a full stop before entering or crossing main highway B, but the traffic on main highway B need only slow down before crossing or entering secondary highway C. See Fig. 2.

Formed in each traffic lane of the secondary highway B, in advance of the intersection A, are three spaced apart signal generating areas D, each comprising a plurality of equi-distantly spaced parallel channels extending at right angles to and entirely across the traffic lane, with ridges between the channels which present relatively wide upper surfaces co-planar with the tops of the highway sections lying fore and aft of such signal generating area. The specific means wherewith I prefer to define and reenforce the channels and ridges in a concrete highway presently will be described in detail.

Still referring to the diagram of Fig. 2, I will say that the two groups of three signal generating areas D usually will be located in their respective highway lanes at least 300 feet in advance of the intersection A. A single signal generating area D is formed in each lane of main highway B at least 300 feet in advance of the intersection.

An automobile is diagrammatically depicted at E to emphasize that the signal generating areas D of each lane of the highway C are separated from each other by a distance somewhat greater than the length of an automobile.

Referring now to Figs. 1 and 3, a standard type of concrete highway embodying the signal generating areas D of the present invention may consist of ordinary pavement slabs 16 between which are interposed, where required, special slabs presenting the signal generating areas to which I have previously alluded. Ends of slab 16, adjacent to which the special slabs are to be installed, suitably may be reenforced by angle irons 17 retained by conventional lag bars or anchors 18.

The special slabs, which present the signal generating areas, are indicated at 19. Such slabs 19 may be provided with edge reenforcing angle irons 20 and 21 equipped, if desired, with some of the lag bars or anchors 18.

Each special slab 19 carries and is surfaced and reenforced by a steel cover plate 22 appropriately conformed to define the parallel channels and associated flat top ridges of the signal generating areas of the traffic lanes of the intersecting highways. In Figs. 1 and 3 such channels and ridges are indicated at 23 and 24, respectively.

Each plate 22 suitably may have welded thereto, and be anchored to its associated slab 19, by a perforated fin 25. Moreover, and more important, the ridge top defining portions 24 of the plate 22 are provided with apertures 26 which are adapted to vent air that otherwise might be trapped beneath the plate when pressed against the wet concrete of a slab 19 in the formation of the latter, and to permit the concrete of the slab to flow upwardly to form buttons, located in such apertures, to assist in binding the plate 22 to the underlying concrete of the slab.

The end portions of each plate 22 are securely anchored to the angle iron end members 20 and 21 by means such as screws 27 (see Fig. 3), the screws being threaded into openings in the angle irons 20 and 21.

I prefer to provide expansion joints between each slab 19 and the pavement slabs adjacent thereto. One such expansion joint is depicted in Fig. 3. It comprises a sealing plate 28 of the same thickness as its associated surfacing or reenforcing plate 22; such plate 28 being anchored to its associated angle iron member 21 by screws 29. A metal strip 30, of the same thickness as plate 28, is secured by screws 31 to the adjacent angle iron 17, and is spaced from plate 28, the space between plate 28 and strip 30 being filled by an asphaltic or other mastic composition 32 of suitable type.

As previously indicated, the relationship between (a) the width of the tops of channels 23 and (b) the width of the ridge top flats 24, and the relationship between (c) the center-to-center spacing of contiguous channels 23 and (d) the lengths of the "rolling flats" of tires passing over the signal generating areas, are quite important to the generation of the audible and physically sensible gentle signals characteristic of the present invention. The "rolling flats" of modern automobiles usually are from five to nine inches in length, and I have found that in order best to cooperate with such rolling flats, the width of the top of each channel 23, and the width of each ridge top flat 24 should be approximately three inches. Thus, the center-to-center distance between adjacent channels 23 is approximately six inches, i. e., somewhat more than the length of the shortest of the rolling flats, and somewhat less than the longest of the rolling flats, ordinarily passing over the signal generating areas.

Each signal generating area D preferably comprises about fifteen of the channels 23 with a separation of at least 125 inches between the adjacent signal generating areas in the traffic lanes of the secondary highway C.

Attention is now directed to Figs. 7 and 8 wherein I have diagrammatically shown an automobile tire F passing over a portion of one of the signal generating areas. In Figs. 7 and 8, as in Figs. 1 and 3, the channels of the signal generating area are indicated at 23 and the intervening ridge top flats are indicated at 24. The rolling flat of the tire is depicted at f. In each view it may be assumed that the tire is rolling in the direction indicated by the arrow.

In Fig. 7 the rolling flat extends across one of the channels 23, extends substantially across the ridge top flat 24 immediately following such channel, and is about to leave the ridge top flat 24 immediately in advance of such channel; whereas, in Fig. 8 the rolling flat f extends entirely across one of the ridge top flats 24 and the following channel 23 and has just engaged the near edge of the next succeeding ridge top flat 24.

It is just when the rolling flat f has reached the position depicted in Fig. 8, i. e., with the very slightly lowered leading end of the rolling flat engaging the near or leading edge of one of the ridge top flats, that a definite but very gentle cushioned impulse is transmitted from the highway to the tire and from thence through intervening less yielding parts of the automobile to the body of the driver. Such impulses when imparted to the tires on the steering wheels of the automobile are transmitted through the steering mechanism, and its associated steering wheel, to the hands and arms of the driver—a very definite advantage when the driver happens to be asleep or for some other reason very inattentive to his driving duties. The generation of these gentle impulses is accompanied by audible "swishing" sounds and such gentle impulses are generated each time the leading edge of the rolling flat of a tire engages a near or leading edge of one of the ridge top flats 24 as just explained. However, since the channels 23, and the intervening ridge top flats 24, extend entirely across and at right angles to the highway lanes, it will be understood that ordinarily the impulses transmitted through the two front tires will occur simultaneously, and similarly the impulses transmitted through the two rear tires will occur simultaneously.

In the light of the foregoing, let us again refer to the diagram of Fig. 2.

Each time an automobile traveling on main highway B comes within 300 feet of intersection A, its driver has intruded into his consciousness (even though he be asleep or for some other reason inattentive to his driving duties) a warning signal consisting of a series of rapidly occurring gentle impulses so impressed upon his body that he cannot possibly fail to receive and apprehend their message even though he does not hear the swishing sounds which accompany their generation.

In the case of an automobile traveling on secondary highway C and coming within 300 feet of the intersection B, the driver will receive a danger signal which consists of three successive series of those rapidly occurring gentle impulses to which I have previously alluded.

In the modified construction of Figs. 4 and 6, I utilize a plurality of individual channeled plates 35 having horizontal wing portions 36 and 37 and a V-shaped central portion 38.

Each plate 35 is provided with a plurality of openings 39 for the dual purpose of providing suitable venting for air which might otherwise be trapped beneath the plate in setting it in the concrete and for permitting the concrete in its plastic condition when the plate is installed to work up into the openings 39 to assist in anchoring the plate in position.

Perforated anchoring plates 40 and 41 are welded beneath each of the wing portions 36 and 37 to be embedded in the concrete of a slab 42 to anchor the plate 35 firmly in position.

In Fig. 6 I have illustrated expansion-contraction joints which may be used when the traffic is somewhat lighter than the maximum loadings which the construction of Fig. 3 is intended to accommodate. One such type of expansion-contraction joint is illustrated at 44. In this form of joint the ends of adjacent slabs 45 and 46 are molded to have interlocking supporting relation by means of a tongue and groove arrangement whereby a groove 47 in the slab 45 receives a tongue 48 in the slab 46. The ends of the slabs are separated slightly and the space between the slabs is filled with a suitable mastic filler 49.

As a means for providing additional lateral support between the slabs, a plurality of pins 50 may have one end thereof anchored in one of the slabs, such as the slab 46 in Fig. 6, the other end of the pin being telescoped within a tube 51 set in the slab 45 to provide a bridging expansion connection between the slabs.

Another type of expansion-contraction joint is illustrated at 52 in Fig. 6. In this type of joint, sheet metal side plates 53 and 54 are anchored as by means of anchors 55 and 56, respectively, in the adjacent pavement slabs indicated at 45 and 57. A corrugated sheet metal strip 60 is arranged to bridge the upper edges of the members 53 and 54 and to provide an expansible sealed connection between these members. A mastic filler 61 is poured into the space between the slabs and above the strip 60 to form a water-proof seal across the top of the joint.

Where severe winter icing conditions are apt to be encountered, it may be desirable to employ a modified structure such as that illustrated in Fig. 5. This modified structure may be used in place of either the individual channeled members 35 of Figs. 4 and 6 or the reenforcing plates 22 illustrated in Figs. 1 to 3.

In the modification of Fig. 5, a channeled member 63 has a dove-tailed groove 64 formed in the bottom thereof in which is mounted a resilient strip 65 which may be of rubber. The presence of the resilient strip 65 in the channel provides a zone of cleavage for frozen mud or water which may have a tendency to fill the grooves in the winter-time. This cleavage zone causes the pressure from the wheels of automobiles being driven across the grooves to fracture such frozen formations along the line of cleavage. Also, since frozen material is not solidly supported at the bottom of the channels, wheels of vehicles passing across the channels will tend to force frozen accumulations downwardly across the sloping sides of the grooved channels and this action, together with the resilient action of the strip 65, acting to force the frozen accumulations back along the sloping sides of the channels, ensures that the channels will be kept reasonably free of icy accumulations.

Having thus illustrated and described my invention, what I claim as new and desire to secure by Letters Patent of the United States is:

1. A highway pavement reinforcing and signal generating member, comprising in combination with a concrete paving slab a metal plate having a pair of substantially flat side portions connected by a V-shaped channeled intermediate portion, the side portions having a plurality of openings therein, the V-shaped intermediate portion being in partially embedded engagement with a pavement slab, and the side portions being in partly embedded engagement with said pavement slab to bring the upper surface of said side portions flush with the top surface of said pavement slab, and anchoring means secured to said plate and extending downwardly into embedded anchoring engagement with the concrete of said pavement to anchor said plate securely to said pavement.

2. In a highway pavement adapted to high-speed vehicle travel, a slab of concrete having a reenforced upper surface structure, said reenforced structure extending throughout the width of a traffic lane of said pavement, and comprising a metal plate having a plurality of narrow grooves in the upper surface thereof, said grooves being disposed transversely of the length of the highway, said plate having a plurality of openings therethrough, the plate being set into the concrete of the slab to have the upper surface of the plate define the upper surface of the slab, and to be coextensive with the surface of the paving adjacent thereto, the concrete of the slab extending upwardly through said openings, and having its upper surface flush with the upper surface of the plate, said plate having anchor means secured thereto, and projecting downwardly therefrom, the anchor means being embedded in the concrete of the slab to anchor the plate thereto, the top surfaces of the plate portions between the recessess all lying substantially in the same plane with each other.

3. A highway pavement having a plurality of normally self-draining shallow slightly spaced signal-generating grooves extending transversely throughout the width of the pavement, the grooves being formed within a predetermined high-speed zone of the pavement, and a resilient element mounted in said pavement lengthwise within each of said grooves to occupy a relatively small area transversely of the grooves to provide an area of weakened support within said grooves whereby accretive formations in the grooves will be broken up by the passage of a vehicle wheel thereover.

4. A highway pavement having a plurality of normally self-draining, shallow, signal-generating grooves extending transversely throughout the width of the pavement, the grooves being formed within a predetermined high-speed zone of the pavement, and a resilient element mounted in the pavement within each of said grooves, the resilient elements extending upwardly into the grooves, free of the side walls thereof, and terminating short of the level of the top edges of the walls of the grooves to weaken hard accretive formations in the grooves, and to deprive such formation of solid support whereby such formation will be broken up and dislodged by the passage of a vehicle wheel thereover.

5. A highway pavement having a plurality of normally self-draining shallow signal-generating grooves extending transversely throughout the width of the pavement, the grooves being formed within a predetermined high-speed zone of the pavement, a metal clip mounted in the pavement at the bottom of each of the grooves, and a resilient strip supported by the clip and projecting upwardly therefrom free of the walls of the grooves, to weaken a hard accretive formation in the grooves and to deprive such formation of solid support whereby such formation will be broken up and dislodged by the passage of a vehicle wheel thereover.

HAROLD B. WHEELER.

REFERENCES CITED

The following references are of record in the file of this patent:

UNITED STATES PATENTS

| Number | Name | Date |
|---|---|---|
| 1,265,404 | Tuteur | May 7, 1918 |
| 1,357,860 | Goodrum | Nov. 2, 1920 |
| 1,671,303 | McClure | May 29, 1928 |
| 2,077,749 | Fischer | Apr. 20, 1937 |
| 2,142,803 | Robertson | Jan. 3, 1939 |
| 2,185,020 | Vostrez | Dec. 26, 1939 |